Patented Oct. 6, 1925.

1,556,005

UNITED STATES PATENT OFFICE.

JACQUE C. MORRELL, OF OAK PARK, ILLINOIS.

EMULSION AND PROCESS OF MAKING SAME.

No Drawing.   Application filed May 18, 1923. Serial No. 639,978.

*To all whom it may concern:*

Be it known that I, JACQUE C. MORRELL, a citizen of the United States, residing in the city of Oak Park, county of Cook, and State of Illinois, have invented certain new and useful Improvements in Emulsions and Processes of Making Same, of which the following is a specification.

This invention relates to the making of emulsions of organic liquids or liquids of an oleaginous character of a more or less viscous nature.

In my Patents Nos. 1,440,355 and 1,440,356 dated December 26th, 1922, emulsions of semi-solid or viscous materials are made by mixing suspensions of non-fluid organic or oleaginous liquids.

The principle of emulsion formation when two such systems are mixed, depends upon the coalescence of the individual particles which make up the dispersed phase of the suspension with the individual globules of the organic liquid or oleaginous substance which makes up the emulsion.

It is the purpose of this invention to extend this principle, or rather to make an application of this principle to the special case of making certain types of emulsions from mixing emulsions of distinctly different types. When one liquid is dispersed through another in which it is partly or wholly immiscible or insoluble, an emulsion is produced. The emulsion therefore, consists essentially of two liquid phases,—a phase considered as a physically distinct, mechanically separable part of the system. The internal phase or dispersed phase, which is a distinct component of the emulsion, may vary in physical properties, that is, this dispersed phase may be made up of more or less viscous globules, and after being in an emulsified state, it may sometimes be desirable to diminish the viscosity, or increase the fluidity of the substance in this internal phase.

The application of the principles brought out in my Patent No. 1,440,356 in which an emulsion is added to a suspension of a non-fluid substance in order to give an emulsion of a resulting substance, the fluidity of which is intermediate that of the coalesced particles is here extended to the present case.

In the present invention, it is desired to present a disclosure process in which the fluidity of an emulsion of a viscous liquid is increased by the addition of an emulsion of a less viscous or more fluid liquid.

For example, if an emulsion of the semi-solid viscous liquid, such as is made in my previously mentioned patent, is desired to be made into an emulsion of a less viscous liquid, more of the emulsion of the oleaginous substance or liquid organic substance is added to the first product. It may be desirable to take an emulsion which has been made up by various processes such as heating of viscous liquid and agitating it in the presence of an emulsifying agent or colloidal substance as a starting material to produce an emulsion of different characteristics. If it is desired to decrease the fluidity of the internal phase of this emulsion, this purpose may be accomplished by adding an emulsion of a less fluid liquid or oleaginous material, the globules of which will disperse, dissolve or mix with the more viscous globules of the first emulsion.

Therefore in carrying out the present invention—(a) an emulsion of a viscous liquid may be made into an emulsion of a less viscous liquid by the addition of an emulsion containing as the internal phase, a liquid less viscous than the initial emulsifying liquid; (b) vice-versa, an emulsion of a very fluid liquid can be changed into an emulsion of a more viscous liquid by the addition of an emulsion containing a liquid as the internal phase more viscous than the substance emulsified in the initial emulsion.

There is a limitation however, upon the combining of emulsions in this manner with the two types of liquids constituting the internal phase must be such that they are miscible in each other, or will dissolve partly or wholly with each other.

For example, if it is desired to produce from an emulsion a very viscous asphalt, a more fluid emulsion, an emulsion of a coal tar oil such as creosote oil may be added to the former. The globules of the coal tar oil which are in the internal phase of the diluting emulsion will dissolve or disperse the globules of the viscous asphaltic substance and an emulsion of a substance intermediate in character as to fluidity will be formed. The same is true, if there is substituted for the emulsion of asphalts, emulsions of tar and soft pitches, bituminous substances in general and other material of a resinous nature. For the creosote oil emulsion, other oils of a less liquid nature may be likewise substituted. The relative proportion of the emulsion of a fluid oil to that of the emulsion containing a more viscous liquid, the more will the final product partake of the emulsion of the less viscous liquid.

It may also be desirable to mix oils of a different character combined in emulsions, these oils being of a vegetable or mineral derivation, in order to impart the characteristics of one emulsion to that of another.

The type of protective colloid used as the emulsifying agent, may in some cases determine whether the system composed of a product resulting from the mixed emulsions will be stable. In general some group of emulsifying agents or protective colloid such as mentioned in my Patent 1,440,356, may be used so that the resulting system will be stable.

This is especially true when the same emulsifying agent is used with both types of emulsion, although it is not invariably the case.

I claim as my invention:

1. A process for varying the fluidity of the dispersed phase of emulsions consisting in combining emulsions of substances of relatively different fluidity contained in vehicles and producing an emulsion with internal phase having a fluidity substantially intermediate the two combining emulsions, the viscosity of the external phase remaining substantially the same.

2. A process for varying the fluidity of the dispersed phase of emulsions consisting in combining emulsions of substances of different fluidities, soluble in each other, and contained in liquid vehicles, and producing an emulsion with internal phase having an intermediate fluidity.

3. A process of varying the characteristics of the dispersed phase of emulsions consisting in combining emulsions of organic substances contained in liquid vehicles and forming an emulsion having an internal phase intermediate characteristics.

JACQUE C. MORRELL.